(No Model.)
W. B. POTTER.
REGULATING ELECTRIC MOTORS.
No. 548,388. Patented Oct. 22, 1895.
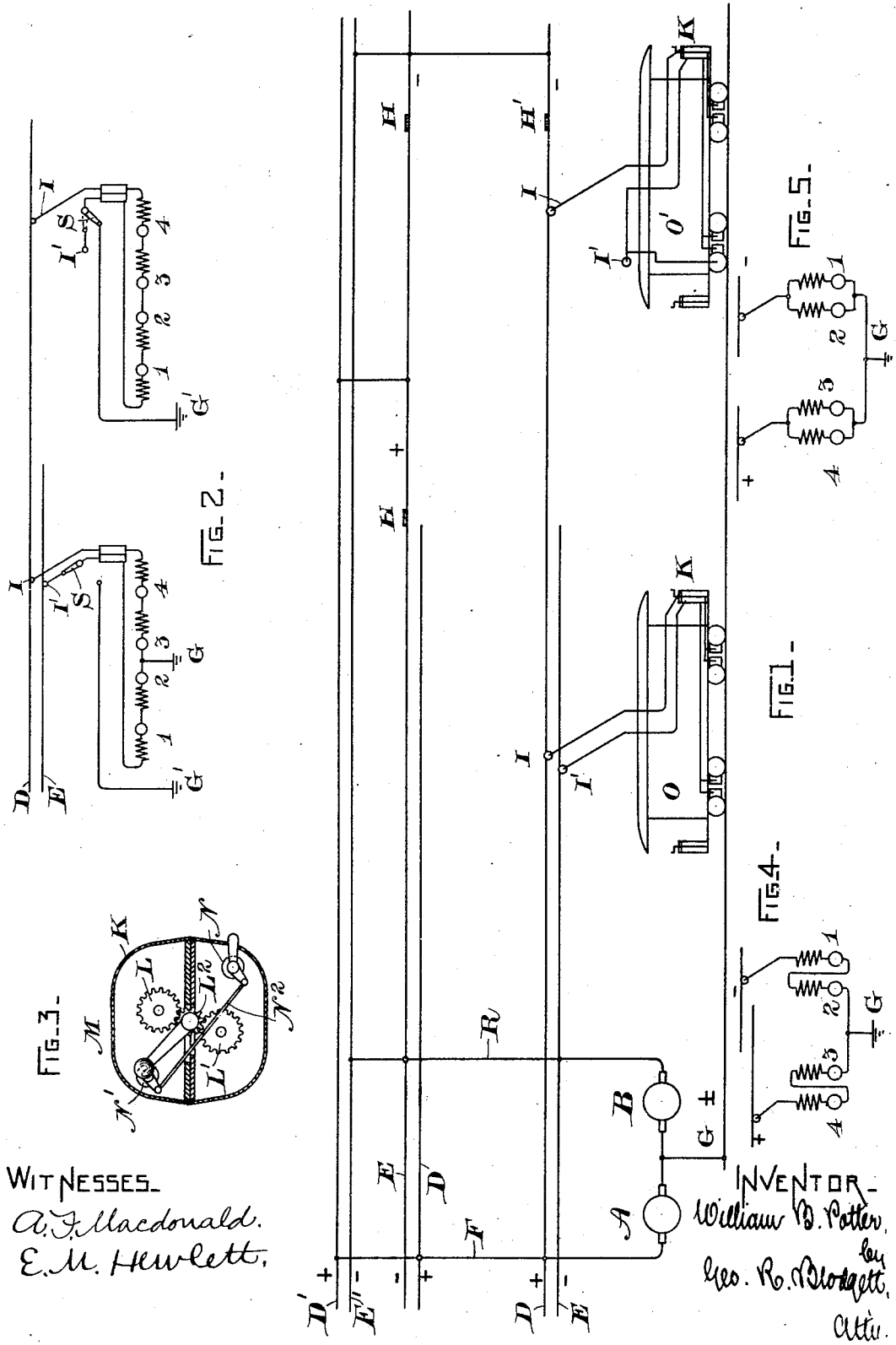
Witnesses
A. F. Macdonald.
E. M. Hewlett.
Inventor
William B. Potter
by Geo. R. Blodgett
Atty.

UNITED STATES PATENT OFFICE.

WILLIAM B. POTTER, OF SCHENECTADY, NEW YORK, ASSIGNOR TO THE GENERAL ELECTRIC COMPANY, OF NEW YORK.

REGULATING ELECTRIC MOTORS.

SPECIFICATION forming part of Letters Patent No. 548,388, dated October 22, 1895.

Application filed July 22, 1895. Serial No. 556,690. (No model.)

*To all whom it may concern:*

Be it known that I, WILLIAM B. POTTER, a resident of Schenectady, county of Schenectady, State of New York, have invented certain new and useful Improvements in Regulating Electric Motors, (Case No. 257,) of which the following is a specification.

My invention relates to the regulation of electric motors, more particularly to such as are used in electric-railway work. It particularly refers to an adaptation of the well-known "series multiple" or three-wire system to electric railways, and has for its object to employ in such a system in practice a voltage of one thousand or twelve hundred between the positive and negative mains, so combining and operating the apparatus that I may with this voltage employ standard railway apparatus, which, as is well known, is designed only to stand a maximum voltage of five hundred or thereabout.

To accomplish the ends pointed out, I employ two motors upon one side of the system and two other motors upon the other side, each of the motors being adapted, as already described, for five hundred volts potential, and the connections of the wiring are those commonly adopted for railway-work—that is to say, I employ two generators in series and ground the connection between them, using the earth and the rails as a return-circuit, or, more strictly, as the neutral of the three-wire system; but by the arrangement which I have adopted I do not at any time return the main current through the earth or track-rails, the path of the current being first through the two motors to a common ground connection from the main having five hundred volts positive potential and then returning by the other line at five hundred negative potential. Only where one pair of the motors would be slightly out of balance with the other pair would any current at all flow in the neutral. It is manifest by this arrangement that I may, if so desired, either dispense altogether with bonding the rails or I may connect them with light wires and thus save a very heavy expense in the copper cost of the road. It is of course to be understood that with this arrangement of wiring I employ the series-parallel method of control for the two sets of motors—such, for instance, as that controller which is described in my Patent No. 524,396, dated August 14, 1894.

By the system thus far described each car maintains a perfect balance within itself. Ordinarily I employ two controllers of standard construction like that described in my patent referred to. They may be placed adjacent to each other and geared to work together from a single operating-handle. This, however, I do not consider indispensable, though preferable.

The arrangement as thus far described necessitates the use of double trolleys, and this is contemplated in my invention. This arrangement is particularly adapted for long-distance or trunk-line work. Where, however, such lines connect with lines within the city limits upon which lower speed is desired, I provide therefor as follows: I so arrange the apparatus that at a certain point outside the city one of the trolleys is withdrawn and the motors are operated all four in series between one of the trolley-lines and ground in the usual manner. For this purpose I provide a switch which changes the arrangement at the time of drawing down the trolley, so that as ordinarily run in the three-wire or double-trolley parts of the line the combinations of the motors will be two sets of two in series and then two sets of two in multiple with the usual resistance control incorporated—such, for instance, as that in patent to Condict, No. 393,323; but when the second trolley is drawn down and the switch thrown the combination would be all four motors in series, thus giving great efficiency over the parts of the road where ordinarily the speed is lowest and where in other systems the efficiency is also lowest because of the large amount of resistance necessary to bring the speed to that proper for transportation through the streets. Where other roads are crossed I arrange the working conductors in any convenient manner, so that they will have approximately the same voltage and of the same sign, and thus avoid the risk of impairing the insulation or leakage of current.

By the arrangements thus far pointed out I am enabled to effect a very great saving in copper, at the same time securing a uniformity of operation in the road which is impossible with a road using the track as its main return, because the resistance of the track varies so between wet and dry weather as to make a great difference in the operation of the cars. I also prefer to connect portions of the single working conductors in alternation to the positive and negative sides of the system. For instance, I would connect, say, a mile of one conductor to one side of the system and by the insertion of "trolley-breakers," so called, connect the next mile to the other side of the system, as in patent to W. H. Knight, No. 533,905. By this method the grades will be divided in such a way that the two sides of the system would not become unequally loaded if for any reason it should become necessary (as by the burning out of both motors upon one side) to run the long-distance trains upon one side of the system only.

The accompanying drawings show diagrammatic representations of my invention.

In the drawings, Figure 1 is a diagram of a portion of the road equipped for both a three-wire system and the city system, showing a car upon each part. Fig. 2 is a diagram showing the motor connections of the cars when running, as shown in Fig. 1. Fig. 3 is a top plan view of two controllers geared to operate from a single handle. Figs. 4 and 5 are diagrams showing the motor connections when run upon the double-trolley or three-wire system.

In Fig. 1 A B are the generators having a common ground connection G to the track, serving, as illustrated, for the neutral main of the three-wire system. D D are the positive mains or conductors. E E are the negatives.

It is to be understood that the positive conductors are at five hundred potential plus, while the negatives are at five hundred potential minus, the ground being taken as zero. The feeders are also shown marked D' E', respectively. The leads from the generators are marked F R, respectively, and connect in a proper way with the positive and negative working conductors.

I have not illustrated in full the system of feeders proper to be employed, as that would be well understood by those versed in the art.

O O' are cars running, respectively, upon the three-wire and the two-wire parts of the system. The connection for the part O is that shown upon the left in Fig. 2, while that of the car O' is that shown upon the right in the same figure. The cars are provided with controllers K and with trolleys I I'. A switch S is also provided in the circuit of the trolley I', which runs upon the negative conductor. This switch may be arranged to be operated by the pulling down of the trolley, in which case the trolley would be provided with some form of automatic detent, or it may be a hand-operated switch and still be within the scope of my invention. The path of the current, as illustrated in Fig. 2 on the left, would be from the trolley I, through one of the controllers, through the motors 4 and 3 to ground, from ground through the motors 2 and 1 to the switch S, trolley I', and back to the generator, the ground G taking only the amount of current necessary to keep the system in balance. In this arrangement it is manifest that one thousand volts potential may be used, and as the ground connection G is left in at all times when running upon the three-wire system the apparatus would only be subjected to a potential of five hundred volts.

I also embody in my invention a peculiar disposition of the positive and negative conductors by which I am enabled to effect a rapid transfer of the vehicle at those points in the system where I change from three-wire to the two-wire arrangement. This, also, is illustrated in Fig. 1. Therein it will be observed that the upper working conductor E is of negative potential, while its corresponding conductor D is positive. In the lower part of the figure, however, the working conductor D is positive and the corresponding conductor E is negative. This presents the advantage of making the adjacent conductors, or, rather, the conductors on adjacent tracks, of the same sign and potential, so that they may be, if desired, interconnected readily to assist in the equal distribution of current. In the upper conductor E the first trolley-breaker H divides the line in such way that the succeeding section, or the section between the two trolley-breakers H H, is positive, and, as will be observed, it is fed from the positive feeder D'. The portion, however, beyond the second trolley-breaker H and the lower trolley-breaker H' is of negative potential, as in the patent to W. H. Knight, to which I have already referred. I so arrange the conductors that one of them—the one which is to be used when the two-wire system is employed—is suspended over the middle of the track, and the other conductor is suspended at a short distance to one side, sufficient to preserve the proper insulation. It is of course to be understood that the trolleys are suitably arranged, one of the trolleys being displaced with reference to the other and the center of the car.

Upon the right in Fig. 2 the trolley I', as upon the right in Fig. 1 in case of the car O', is depressed. The switch S is also thrown and the central ground connection G is broken and the other ground connection G' substituted therefor, so that in this position the path of the current would be from the trolley I through one of the controllers, through the motors 4 3 2 1, over the switch S, and out to ground at G'. Of course in this instance the entire voltage available would be only five hundred.

In Fig. 3 I have illustrated two controllers of the type already referred to placed back to back, so as to practically form a single controller. A common operating-handle is provided with a single gear $L^2$, meshing into the two pinious L L' upon each of the controller-cylinders, respectively. Two reversing-switches N N' are also provided, and these are also connected by a rod N², so that when one is thrown the other is also operated. With the exception of the gearing the parts are well known in the art, being the now familiar form of the so-called "controller" K. Further illustration is not deemed necessary, as the particular construction of the controller is illustrated and described in my patent before referred to.

Referring to Figs. 4 and 5 I show in diagram the combinations employed in running the apparatus on the three-wire system, it being understood that in every case the intermediate connection between the motors is grounded.

In Fig. 4 the path of the current is from plus trolley-line through the motors 4 3 to ground, and from ground through the motors 2 1 to the minus line.

In Fig. 5 the path of the current will be from the plus trolley-line through the motors 4 and 3 in multiple to ground, and similarly from the ground through the motors 2 1 in multiple to the minus line.

I have not illustrated the combinations of the motors with resistance, as these are specifically pointed out in my patent above referred to, and the particular methods of change from series to multiple are not of my sole invention, and are therefore not described in this application.

By the system which I have just pointed out I not only obtain great flexibility of control and avoid the necessity of bonding the rails heretofore existing, but I am enabled while using one thousand or twelve hundred potential to employ standard apparatus operating upon half that potential and to thus effect very great saving in the copper cost of the road. At the same time I avoid all trouble in balancing the system and from improper operation of the motors caused by this and caused by the motors robbing each other of current. It has been proposed to employ in long-distance transportation such as that to which my system is particularly adapted two generators in series and to always employ two motors in series; but it is manifest that this is an impracticable arrangement, inasmuch as if one of the motors slips they might be both destroyed before the slip is overcome, or if one of the motors becomes disabled from any cause the other motor could not be used to operate the train, but the entire equipment would be disabled, whereas by the plan which I have adopted it is perfectly feasible to cut out one motor upon each side of the system and operate the train from the remaining motors, as they in this case are substantially in series on one-thousand-volt circuit, with the ground connection, however, still in, so that each motor is only subjected to five hundred volts difference of potential. This may be in case of two motors the method of running the system—that is, instead of the four motors which I have illustrated I employ in some cases two motors only. In this application, however, I do not specifically claim these two motors, although in the claims which I make I aim to embrace this combination in the broadest aspect of this case; but in my application, Serial No. 558,599, filed August 8, 1895, I have illustrated and described means for running two motors in the way herein pointed out for four, and in that application I aim to specifically include the use of two motors only, whereas in this I purpose embracing combinations of any number of motors (two or more) operated in the way herein described. It is also feasible at any time to disconnect one side of the system and operate the equipment upon the other side alone where this becomes necessary for purposes of repair or from accident, the motors then running in parallel upon five hundred volts. The system which I have devised thus becomes of great flexibility and better adapted for the purposes designed than any one with which I am familiar.

What I claim as new, and desire to secure by Letters Patent of the United States, is—

1. The art of operating electric motors upon a three-wire or series-multiple electric railway, which consists in running upon each car an equal number of motors upon each side of the system, and making similar changes or steps in the control of each side.

2. The art of operating electric motors upon a three-wire or series-multiple electric railway, which consists in running upon each car an equal number of motors upon each side of the system, and simultaneously making similar changes or steps in the control of each set of motors.

3. The art of operating electric motors upon a three-wire or series-multiple electric railway, which consists in dividing the motors upon each car into two groups, one group upon each side of the system, and simultaneously operating the two groups by the series-parallel system of control.

4. The art of operating electric motors driving an electrically-propelled vehicle herein set out, which consists in connecting the motors in groups of two upon opposite sides of the three-wire system for one rate of speed, and then connecting them in a single group between the neutral and one of the opposite wires of the system for different speeds.

5. An electrically-propelled vehicle, a plurality of motors thereon connected in groups or sets upon the two sides of a three-wire system, and means controlled by a single handle for simultaneously regulating the two sets of motors.

6. In combination a railway track forming the neutral in a three-wire system, positive and negative conductors forming the outer wires of the system extending along the track, an electrically-propelled vehicle on the track making traveling contact with both the positive and negative conductors, motors upon the vehicle in circuit with each side of the system, and means carried by the vehicle for simultaneously regulating the motors upon each side.

7. An electrically-propelled vehicle, a plurality of motors thereon divided into two groups, one group connected upon each side of the three-wire system, a controller for each group and a connection between the controllers whereby they are both operated by a single handle, and the motors simultaneously regulated upon each side of the system.

8. An electrically-propelled vehicle, a plurality of motors driving the vehicle, the motors being connected in groups upon each side of a series-multiple or three-wire system, and means for regulating the motors.

9. A plurality of electric motors connected in groups upon each side of a three-wire or series-multiple system and geared to and simultaneously driving a common load, and means for regulating the motors.

10. A number of electric motors connected in equal parts upon each side of a three-wire or series-multiple system, mechanically connected to and simultaneously driving a common load, and means for regulating the motors.

11. A plurality of electric motors connected in groups upon the two sides of a three-wire or series-multiple system and geared to a common load, and means for controlling the motors in each group by the series-parallel system of control.

12. An electrically-propelled vehicle, a plurality of motors thereon divided into groups or sets of two connected upon each side of a series-parallel or three-wire system, and controlling means for the motors arranged to simultaneously control the motors on each side by the series-parallel system of control, substantially as described.

13. In combination a pair of motors, a controlling switch for such motors, a second pair of motors, a similar controlling switch for the second pair of motors, and common operating means for the two controlling switches.

14. In combination a pair of motors, a series-parallel controlling switch for the two motors, a second series-parallel switch for the second pair of motors, and means for simultaneously operating the two controlling switches.

15. In a series-multiple or three-wire electric railway having two tracks or sets of conductors, adjacent conductors for the different tracks having the same sign and potential, substantially as described.

In witness whereof I have hereunto set my hand this 17th day of July, 1895.

WILLIAM B. POTTER.

Witnesses:
A. F. MACDONALD,
E. W. CADY.